(12) United States Patent
Guevel et al.

(10) Patent No.: US 6,410,126 B1
(45) Date of Patent: Jun. 25, 2002

(54) UNIDIRECTIONAL TAPE OF CARBON FIBERS

(75) Inventors: Jean Guevel, Viriat; Guy Bontemps, Tenay, both of (FR)

(73) Assignee: Sa Schappe, Ban de Laveline (FR)

( * ) Notice: Subject to any disclaimer, the term of this patent is extended or adjusted under 35 U.S.C. 154(b) by 0 days.

(21) Appl. No.: 09/570,429

(22) Filed: May 12, 2000

(30) Foreign Application Priority Data

May 20, 1999 (FR) .......................................... 99 06596

(51) Int. Cl.[7] .................................................. D04H 1/00
(52) U.S. Cl. ............................... 428/292.1; 428/297.4; 428/298.1; 428/323; 428/367; 428/375; 428/408; 427/420; 427/434.4; 427/443
(58) Field of Search ..................... 428/367, 375, 428/323, 408, 195, 297.4, 298.1, 292.1; 427/420, 434.4, 443

(56) References Cited

U.S. PATENT DOCUMENTS 4,919,739 A    4/1990   Dyksterhouse et al.
4,990,207 A    2/1991   Sakai et al.
5,871,604 A *  2/1999   Hohman ..................... 156/62.8

FOREIGN PATENT DOCUMENTS

| EP | 0 274 970 A1 | 7/1988 |
| EP | 0 330 980 A2 | 9/1989 |
| WO | WO 92/17331 | 10/1992 |
| WO | WO 96/01177 A1 | 1/1996 |
| WO | WO 98/44183 A1 | 10/1998 |

\* cited by examiner

*Primary Examiner*—Cynthia H. Kelly
*Assistant Examiner*—J. M. Gray
(74) *Attorney, Agent, or Firm*—Oliff & Berridge, PLC

(57) ABSTRACT

In this tape (15), the fibers are discontinuous and have a length distribution such that the mean fiber length, that is to say the mean length of 50% of the fibers in a specimen, is between approximately 40 and 70% of the length of the longest fiber in the specimen, the fibers being combined by means of a resin (10) or of an adhesive having a fugitive nature. Application to the production of components made of composites.

16 Claims, 2 Drawing Sheets

UNIDIRECTIONAL TAPE OF CARBON FIBERS

The subject of the present invention is a unidirectional tape of carbon fibers.

It is common practice in the composites industry to use carbon fibers because of their reinforcing capability and their lightness. Carbon fibers able to be used fall within various grades that may be defined as follows, depending on their Young's modulus:

| | |
|---|---|
| amorphous | $E \leq 100$ GPa |
| low modulus | $100 < E \leq 180$ GPa |
| high strength | $180 < E < 250$ GPa |
| intermediate modulus | $250 \leq E < 350$ GPa |
| high modulus | $350 \leq E < 500$ GPa |
| ultrahigh modulus | $E \geq 500$ GPa |

These fibers may be obtained from precursors, such as polyacrylonitrile (PAN), pitch or rayon.

A first solution consists in using continuous carbon filaments having the same orientation, which are impregnated with thermosetting resins. These continuous filaments form ribbons or tapes, oriented in a particular way depending on the stresses to which the final component will be subjected. These tapes may be used singly or stacked one on top of another after having been cut beforehand to the dimensions of the component to be produced. The relative orientations of the filaments in the tapes may vary from ±0 to 45°, ±0 to 30° or ±0 to 60°. All angular combinations are possible, both symmetric and asymmetric ones. The preforms employed are then consolidated, by cross-linking the resin by raising the temperature in an autoclave, using either closed molds or membrane devices, in which the preforms are under vacuum.

Difficulties are encountered in these various systems when the components include substantial projections or indentations. This is because the continuous carbon filaments cannot slide relative to one another. Consequently, some of the filaments break or folds are formed.

The same difficulties are encountered in the technology of producing carbon-carbon components obtained using either a wet route or a gas route.

In carbon-carbon materials, the reinforcing fibers are made of carbon and the matrix is a carbon substrate deposited between the fibers and bonded to the latter. The carbon substrate is obtained by carbonizing phenolic resins in an inert atmosphere or under vacuum, these being deposited beforehand during the initial impregnation of the unidirectional carbon tapes. The carbonization comprises a certain number of steps in order to end up with the correct densification (decrusting, reimpregnation, etc.). This constitutes the wet technique.

The gas technique consists in starting with unimpregnated unidirectional tapes, draped beforehand in a mold porous to gases. A gas stream, consisting of a saturated hydrocarbon, for example methane $CH_4$, and which has undergone, before flowing through the preform, a cracking operation which allows the carbon atoms to be separated from the hydrogen molecules: $CH_4 \rightarrow C+2H_2$, flows through the oven. The carbon atoms are trapped in the fibrous preform and constitute, after a relatively lengthy time, interspersed by decrusting operations, the solid matrix which bonds the fibers of the preform together.

It is also known, from European Patent EP-A-274,970, to convert continuous carbon filaments into discontinuous fibers, by slow controlled drawing, using a cracking technique. The fibers obtained are of variable, but controlled, length. After obtaining parallel fibers, these fibers are subjected to a conventional spinning operation. However, in order to carry out a spinning operation, it is necessary to have fibers whose mean length is between 90 and 120 mm approximately. Under these conditions, it is not possible to produce components of complex shape and having very deeply indented or projecting features since if the fibers move significantly with respect to one another a dislocation of the tape is produced. Conversely, if a component having numerous but small deformations has to be produced, the fibers are too long to allow the tape to follow such deformations.

The object of the invention is to provide a unidirectional tape of carbon fibers, which can be deformed in order to produce deeply indented shapes or to produce a plurality of small raised features. For this purpose, in the tape to which the invention relates, the fibers are discontinuous, have a length distribution such that the mean fiber length, that is to say the mean length of 50% of the fibers in a specimen, is between approximately 40 and 70% of the length of the longest fiber in the specimen, and the fibers are combined by means of a resin or of an adhesive having a fugitive nature.

Since the fibers are discontinuous, they can slide relative to one another during the forming step for producing a component, after the viscosity of the resin has been lowered or the adhesive having a fugitive nature has allowed the fibers to be released. Advantageously, this tape has an extendibility corresponding to a relative displacement of the carbon fibers within a range of between 0 and 45% of the longest fiber.

According to one characteristic, the mean fiber length is greater than 30 mm.

According to one option, the mean fiber length is greater than 120 mm.

According to another option, the mean fiber length is between 30 and 90 mm. It is apparent from the foregoing that the mean fiber length may vary over a very wide range, making it possible, according to applications, to have fibers whose mean length is large or, on the contrary, fibers whose mean length is small.

The tape according to the invention may be produced with fibers obtained from carbon multi-filaments chosen from among all the grades defined above. The tape may have a width of, for example, between 10 and 200 mm, depending on the choice of linear density of the multifilaments as well as on the number of multifilaments which are juxtaposed in order to obtain the desired width.

The linear densities of the starting multifilaments may be chosen from the following values, where $K=10^3$: 400 K, 320 K, 160 K, 80 K, 70 K, 60 K, 50 K, 40 K, 24 K, 12 K, 6 K, 3 K.

According to one embodiment of the tape according to the invention, the fibers are combined by impregnating them with a thermoset resin chosen from epoxy, phenolic, bismaleimide and furan resins.

According to another embodiment of this tape, the fibers are combined by spraying a cellulose-based spray.

Next, the carbon-fiber assembly is coated, on both its sides, with a protective film, for example a polyethylene film. This film protects the assembly and makes it easier to handle, especially allowing it to be stored in a position wound on a mandrel.

A process for producing this tape consists, starting from a series of continuous and parallel carbon filaments, in cracking the filaments by slow and controlled drawing, inside a cracker, and then in combining the discontinuous fibers in line, without deforming the tape and without exerting tension on the latter, by means of a resin or of an adhesive having a fugitive nature.

Depending on the characteristic of the multifilaments taken into the cracking machine and depending on the desired mean length for the fibers of a specimen, it is possible to adapt the characteristics of the machine. Thus, in order to obtain long fibers, it is necessary to move the series of tensioning rollers further apart and to have a relatively small speed difference from one series of rolls to the next whereas, in order to obtain shorter fibers, the distance between the various series of tensioning rolls must be reduced and the speed difference from one roll to another must be increased. These adjustments must also take into account the linear density and the grade of the carbon filaments.

According to a first method of implementation, this process consists in combining the discontinuous carbon fibers by resin impregnation, by passing them through a bath.

According to another method of implementation, this process consists in combining the discontinuous carbon fibers by spraying a cellulose-based spray onto both sides of the tape.

In either case, this process consists, after the discontinuous carbon fibers have been combined, in evaporating the solvents.

Finally, this process consists, after the discontinuous carbon fibers have been combined, in depositing two protective strips, for example made of polyethylene, on both sides of the tape, before it is wound on a mandrel.

In any case, the invention will be more clearly understood with the aid of the description which follows, with reference to the appended schematic drawing illustrating, by way of nonlimiting examples, two embodiments of an apparatus for implementing this process, allowing a tape according to the invention to be obtained:

Figure 1:
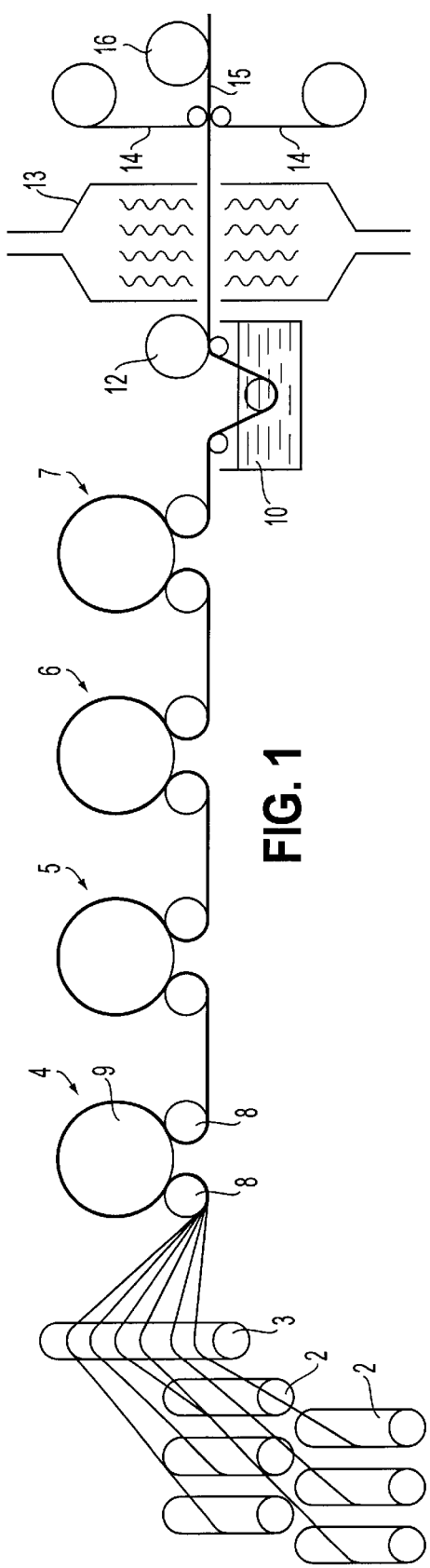
FIG. 1 is a highly schematic side view of a plant making it possible to obtain a tape of fibers according to the invention.

FIG. 1 comprises a certain number of reels 2, on which continuous carbon filaments are wound. These filaments are paid out simultaneously and pass over the same roll 3, from which they converge to form a ribbon. The ribbon passes into a cracking machine comprising four groups of rolls denoted respectively by the references 4, 5, 6 and 7, each group comprising two identical lower rolls 8 against which a third roll 9 bears, this third roll bearing strongly on the first two via a hydraulic device. The respective circumferential speeds of the various groups of rolls 4–7 increase progressively. The fibrous carbon tape is therefore continuously drawn. This causes the continuous filaments to break, preferably at places which have a structural defect and consequently a weakness in the mechanical properties. The two fundamental parameters that determine the fiber-length distributions are the relative differences between the various groups of rolls and the separation of the pinching points. After leaving the cracking machine, that is to say downstream of the group 7 of rolls, the tape consists of an assembly of discontinuous carbon fibers of various lengths. Since this ribbon does not have a high mechanical strength, it is necessary, according to the invention, to combine the fibers without deformation and without tension.

In the embodiment shown in FIG. 1, the tape passes through a resin bath 10. The amount is set by expressing, by passing between two rollers denoted by the general reference 12. A solvent evaporation device 13 may optionally be placed downstream of the impregnation station. Downstream of this evaporation station there is a station allowing the tape to be coated on both its sides with two polyethylene films 14 intended to protect the tape. Downstream of the station for positioning the films 14, the tape 15 thus formed is wound on a mandrel 16.

It may be noted that the carbon filaments used might have undergone a surface treatment, such as electrochemical or forced-air oxidation. A sizing composition, consisting of a hydrocarbon oil to which an emulsifier has been added, is deposited in an amount of 0.1 to 0.2% so as to ensure that there is good cohesion of the bundle of continuous fibers, and that the fibers can slip easily with respect to one another during the cracking operation. This sizing composition may be removed by washing in water at 60° C., the pH of the water being adjusted to 12 using sodium carbonate.

Figure 3:
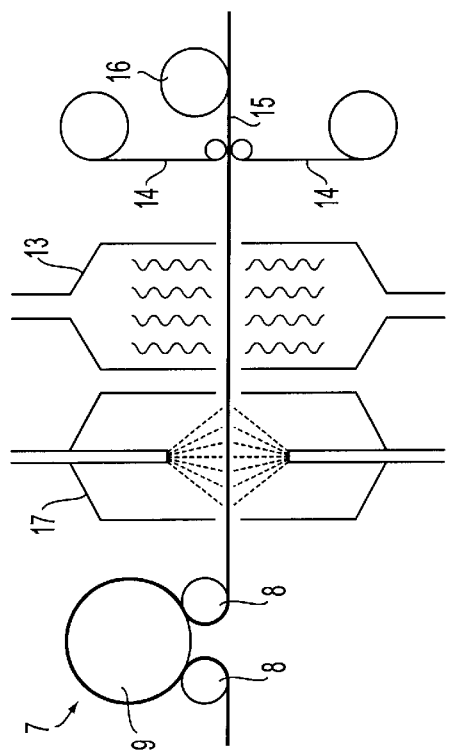
FIG. 3 is a partial view of another plant, showing more especially the station for combining the carbon fibers.
Figure 2:
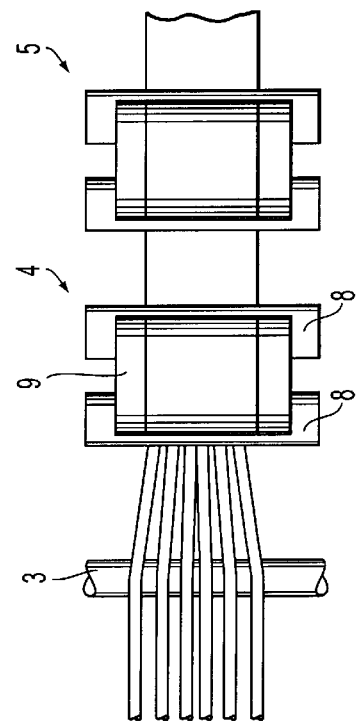
FIG. 2 is a partial top view at the station for carrying out the cracking.

FIG. 3 is a partial view of another plant, in which the tape is obtained under the same conditions as above, by fracture of filaments inside a cracking machine. In this case, consolidation of the tape is done dry, especially for carbon-carbon applications. The tape passes through a chamber 17 inside which a cellulose-based spray is sprayed onto both sides of the tape so as to give it additional cohesion. Next, the tape passes through an evaporation device 13 before being protected by polyethylene films.

The tapes thus obtained may be arranged in the suitable geometry, before undergoing, if this is required in certain applications, a needle-punching operation intended to bond the tapes together, orienting some of the fibers in the z direction.

In general, the additives are removed thermally, in an inert atmosphere between 1000 and 1500° C., before a gas-based densification operation.

FIGS. 4 to 8 show five fiber-length distribution diagrams, in five specimens intended for different applications. In each of these diagrams, $L_M$ denotes the longest fiber length and $L_m$ denotes the mean length for 50% of the population. The maximum relative displacement of the fibers with respect to one another is set within the range of 0 to 45% of the longest fiber.

Figure 4:
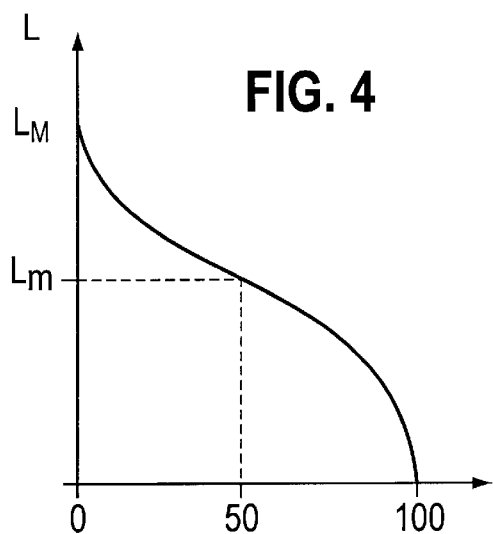
FIGS. 4 to 8 are five views showing the fiber-length distribution, in five different specimens respectively.
Figure 5:
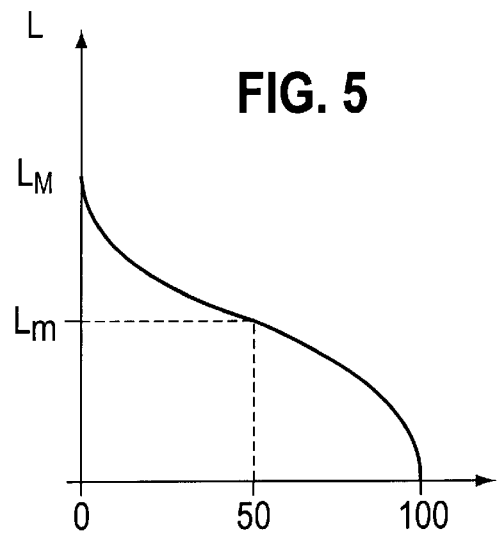
Figure 6:
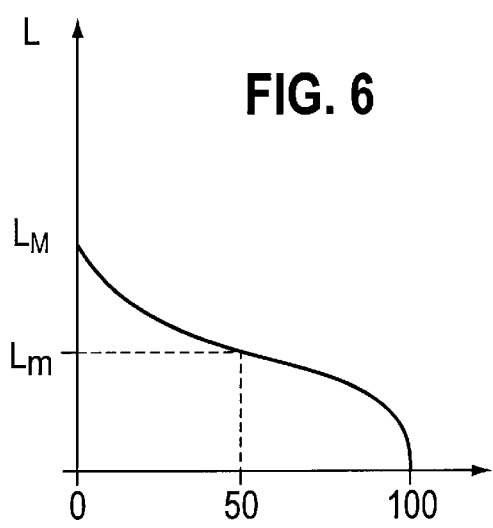
Figure 7:
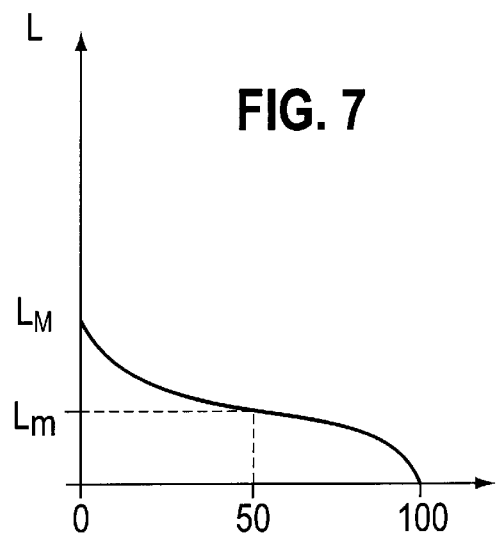
Figure 8:
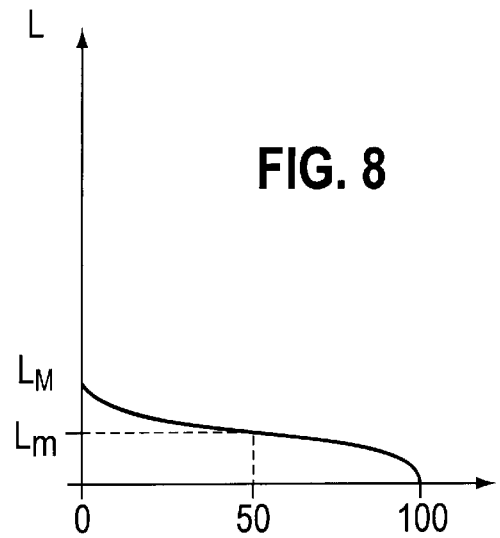

The diagrams corresponding to the various figures have been established by using specimens whose fiber lengths and whose relative displacement of the fibers with respect to one another are given in the following table:

|  | $L_M$ | $L_m$ | Relative displacement of the fibers |
|---|---|---|---|
| FIG. 4 | 220 mm | 120 mm | 0 to 99 mm |
| FIG. 5 | 170 mm | 95 mm | 0 to 76.5 mm |
| FIG. 6 | 128 mm | 70 mm | 0 to 57.6 mm |
| FIG. 7 | 90 mm | 50 mm | 0 to 40.5 mm |
| FIG. 8 | 50 mm | 30 mm | 0 to 22.5 mm |

It is apparent from this table that, by virtue of the invention, tapes can be produced from unidirectional carbon fibers, with discontinuous fibers whose length may be carefully tailored to the desired applications. Therefore, in order to produce components in which the elongation of the tape must be high, it is possible to use very long fibers, whereas to produce components having, in particular, a plurality of small deformations, it is possible to use very short fibers. It should be recalled that short fibers and long fibers could not be used in the prior techniques involving discontinuous fibers, all these having to be chosen within a very small length range in order to allow a subsequent spinning operation to be carried out.

Finally, the economical nature of the process, and consequently of the tapes thus obtained, should be stressed in so far as the combining operation carried out is substantially less expensive than a spinning operation, this combining operation being carried out using simple means, right after the cracking process.

What is claimed is:

1. A unidirectional tape of carbon fibers, wherein the fibers are discontinuous, have a length distribution such that the mean fiber length is between approximately 40 and 70% of the length of the longest fiber, as determined by comparing the mean length of 50% of the fibers in a specimen with the length of the longest fiber in the specimen, and the fibers are combined with a resin or with an adhesive having a fugitive nature.

2. The tape as claimed in claim 1, which has an extendibility corresponding to a relative displacement of the carbon fibers within a range of between 0 and 45% of the length of the longest fiber.

3. The tape as claimed in claim 1 wherein the mean fiber length is greater than 30 mm.

4. The tape as claimed in claim 3, wherein the mean fiber length is greater than 120 mm.

5. The tape as claimed in claim 3, wherein the mean fiber length is between 30 and 90 mm.

6. The tape as claimed in claim 1, wherein the fibers are combined by impregnating with a thermoset resin selected from the group consisting of epoxy, phenolic, bismaleimide and furan resins.

7. The tape as claimed in claim 1, wherein the fibers are combined by spraying a cellulose-based spray.

8. The tape as claimed in claim 1, wherein the tape is coated on a first side and a second side with a protective film.

9. The tape as claimed in claim 8, wherein the protective film is a polyethylene film.

10. A unidirectional tape of carbon fibers, wherein the fibers are discontinuous, substantially parallel and have a length distribution such that the mean fiber length is between approximately 40 and 70% of the length of the longest fiber, as determined by comparing the mean length of 50% of the fibers in a specimen with the length of the longest fiber in the specimen, and the fibers are combined with a resin or with an adhesive having a fugitive nature.

11. A process for producing the tape as claimed in claim 1, comprising:

cracking a series of continuous and parallel carbon filaments by slow and controlled drawing, inside a cracker; and combining the discontinuous fibers in line, without deforming the tape and without exerting tension on the tape, with a resin or with an adhesive having a fugitive nature.

12. The process as claimed in claim 11, wherein combining the discontinuous carbon fibers comprises impregnation with resin, by passing the discontinuous fibers through a bath.

13. The process as claimed in claim 12, wherein after the discontinuous carbon fibers have been combined, solvents are evaporated.

14. The process as claimed in claim 11, wherein combining the discontinuous carbon fibers comprises spraying a cellulose-based spray onto each of a first side and a second side of the tape.

15. The process as claimed in claim 11, wherein after the discontinuous carbon fibers have been combined, a protective film is deposited on each of a first side and a second side of the tape, before the tape is wound on a mandrel.

16. The process as claimed in claim 15, wherein the protective film is a polyethylene film.

* * * * *